(12) United States Patent
Cliffton

(10) Patent No.: US 6,260,309 B1
(45) Date of Patent: Jul. 17, 2001

(54) SPLIT-SPHERE OBSERVATORY DOME WITH A ROTATING OCULUS WINDOW

(76) Inventor: Ethan W. Cliffton, 663 Rockaway Beach Ave., Pacifica, CA (US) 94044

( * ) Notice: Subject to any disclaimer, the term of this patent is extended or adjusted under 35 U.S.C. 154(b) by 0 days.

(21) Appl. No.: 09/452,550

(22) Filed: Dec. 1, 1999

Related U.S. Application Data

(60) Provisional application No. 60/110,828, filed on Dec. 2, 1998.

(51) Int. Cl.[7] .............................. G02B 26/00; E04B 1/346
(52) U.S. Cl. ...................... 52/66; 52/72; 52/18; 52/80.1; 52/81.1; 49/40; 49/41; 359/894; 359/227
(58) Field of Search ...................................... 52/80.1, 81.1, 52/66, 86, 72, 245, 65, 18; 49/40, 41; 359/894, 227, 234

(56) References Cited

U.S. PATENT DOCUMENTS 4,840,458    6/1989   Cliffton ................................ 350/319

OTHER PUBLICATIONS

"Project Keystone," Electro Optic Systems Pty. Limited, Queanbeyan, Australia, Sep. 1997.

*Primary Examiner*—Christopher T. Kent
*Assistant Examiner*—Jennifer I. Thissell
(74) *Attorney, Agent, or Firm*—Kenyon & Kenyon

(57) ABSTRACT

A split-sphere observatory enclosure includes an antrum and a rotor including an oculus. The oculus is covered by an oculus window, which is rotatably mounted to the rotor. As an instrument housed by the enclosure moves to track an object or point across the sky, the oculus window is rotated to maintain a fixed orientation with respect to the instrument.

8 Claims, 4 Drawing Sheets

SPLIT-SPHERE OBSERVATORY DOME WITH A ROTATING OCULUS WINDOW

RELATED APPLICATIONS

This application claims priority to the extent available under 35 U.S.C. §119(e)(1) to provisional application no. 60/110,828, filed Dec. 2, 1998.

BACKGROUND OF THE INVENTION

The present invention pertains to a rotating oculus window in a split-sphere observatory dome. The split-sphere observatory dome may be of the type described in U.S. Pat. No. 4,840,458 to Ethan W. Cliffton (issued Jun. 20, 1989), the disclosure of which is hereby incorporated by reference in its entirety. Such a dome may be used, for example, to house a telescope, satellite tracking equipment, or any other equipment requiring an oculus.

Observatory domes which are, for example, adapted to be utilized for astronomical purposes are generally of a hemispherical configuration and have been provided with an aperture of generally rectangular configuration running longitudinally from the area of the apex of the dome (zenith or vertical axis) downwardly to the vicinity of the equatorial region of the dome (horizontal axis) so as to facilitate the aiming or sighting of a telescope or the like there through.

A dome of the nature described is generally provided with a weather-tight shutter assembly adapted to permit selective opening and closing of the sighting aperture. The shutters utilized are normally fabricated from sheet metal and are characterized by a generally elongated rectangular, longitudinally curved, or convex configuration and are mounted exteriorly of the dome so as to be adapted to uncover the sighting aperture by upward movement of the shutters on a plane tangentially disposed with respect to the curvature of the dome.

It is important that the telescope or other equipment usually housed within such domes be properly protected from the entrance of moisture into the dome. One problem with conventional domes results from the fact that under present practice the shutters do not provide a completely water-tight closure in the normal closed position. Thus, water may enter the interior of the dome and thereby cause considerable damage to the instruments within the dome.

Conventional observatory domes of the type described above suffer from a number of other problems which are primarily attributable to the use of shutters as described above. In particular, in conventional observatory domes large openings are not possible without limiting horizon viewing with conventional shutters and wind screens. Moreover, the concentric protrusions common to conventional shutter design increase wind load and cavitational icing. Further, conventional domes require massive arch girders and eccentric ring girders to resist bending and spreading of the slot. Finally, the provision of moveable shutters hinders the weather resistance of the dome as discussed above.

A split-sphere dome with a fixed shutter obviates the above-described disadvantages experienced in conventional observatory domes. A split-sphere dome such as the one disclosed in U.S. Pat. No. 4,840,458 is an improvement over conventional telescope domes, which provided a vertical open slit to allow the telescope to view the sky. The conventional dome was essentially designed for astronomy and therefore, the oculus was an open slit in the dome wall through which air could move in and out, and the telescope was located in the center. By providing a fixed shutter in a split-sphere dome, the weather resistance of the dome may be increased and the size of the opening (oculus) may be increased, as well as other advantages that may be achieved with this design. One advantage of the split-sphere design is the ability to mount a fixed window in a dome as an oculus. Rather than having simply a hole in the dome open to the atmosphere when the shutter is open, this design may seal the dome to the atmosphere. For example, in a dome designed according to U.S. Pat. No. 4,840,458, a temperate, clean-room environment for, for example, a laser telescope or a lidar (infrared laser) device may be provided. The window shields the telescope (or other housed device) from contact with the outside atmosphere and makes it possible to control the interior environment (e.g. heating and cooling) of the dome. An example of a dome with a fixed window was built by Electro Optic Systems, Queanbeyan, NSW, Australia.

As a telescope or other housed device moves (e.g., pivots about an axis) to track an object or location across the sky, the oculus moves with it. In certain applications where the oculus includes a window, orientation of the window to the housed device may be required to remain fixed, even where the device moves to track an object across the sky. For example, where there are multiple devices looking through multiple sections of subsections of the window, or where the window is polarized, the orientation of the window to the housed device(s) may be required to be constant.

SUMMARY OF THE INVENTION

In one embodiment of the present invention, a split-sphere dome is provided including a cylindrical base, an antrum shell, a rotor shell, and an oculus with an oculus window rotatably supported by the rotor shell and adapted to rotate to provide a predetermined orientation between the oculus window and an instrument housed within the split-sphere observatory dome, despite a rotation of the rotor shell.

DETAILED DESCRIPTION

By providing for the rotation of an oculus window in a split-sphere observatory dome, the orientation of the window to a device housed in the dome can be maintained as the device moves to track across the sky. In the case where multiple lasers are provided outside the center of a telescope, (e.g., around the circumference of the telescope), multiple sub-windows may be provided in the oculus window. As the telescope (and therefore the oculus) moves across the sky to, for example, track a satellite, the window is rotated so that the sub-windows remain in a fixed position with respect to the lasers. Rotation of an oculus window may also be employed, for example, in the case of a polarized window to keep the polarizing lines in a constant orientation with respect to the housed device.

Figure 1:
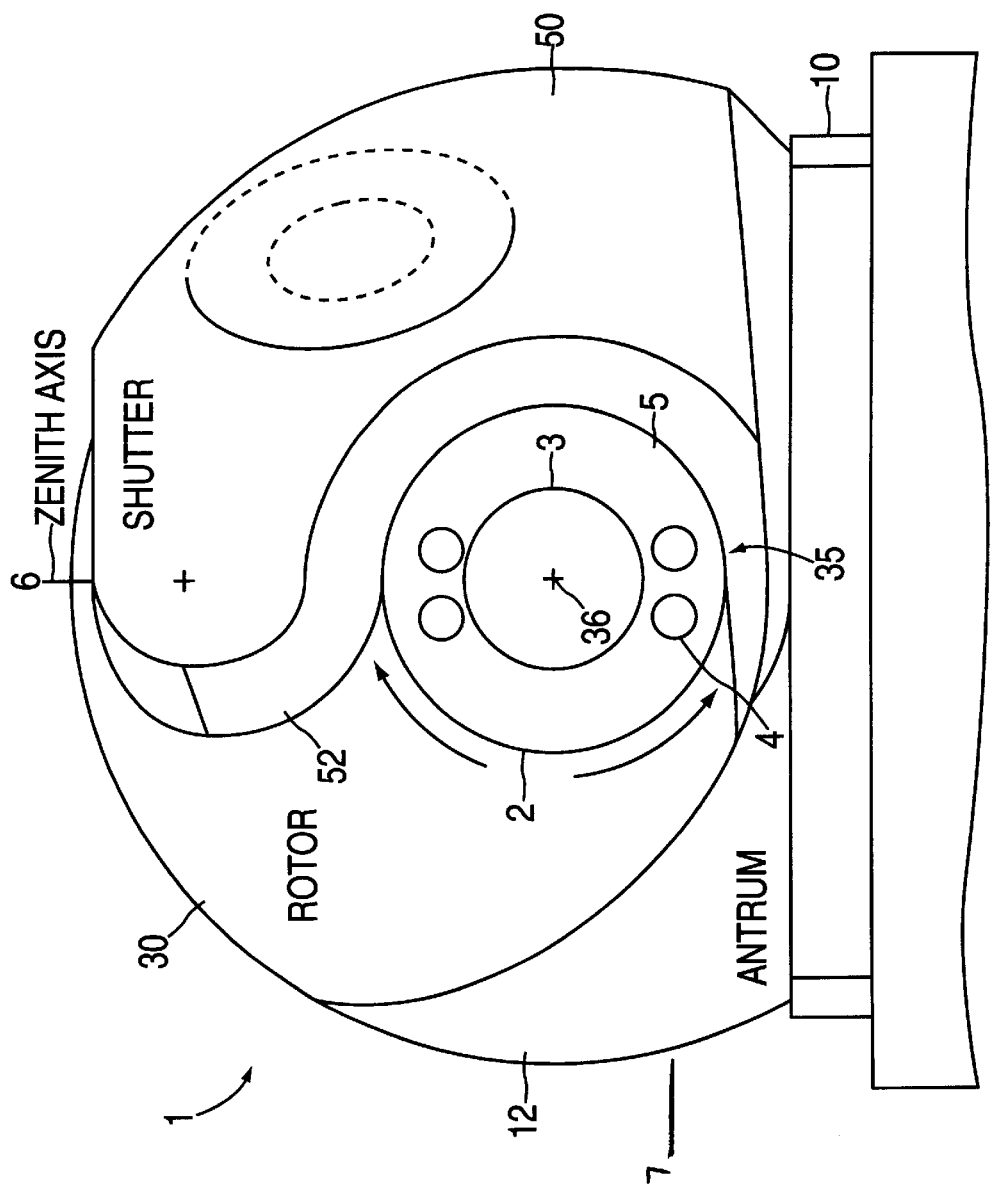
FIG. 1 is a front elevation view of a split-sphere observatory dome with a rotating oculus.

FIG. 1 shows a split-sphere dome 1 with a rotating oculus 35, according to an embodiment of the present invention. A cylindrical base 10 supports an antrum shell 12 and is adapted so that the antrum shell may rotate about the zenith axis 6 of the dome 1. A rotor shell 30 is supported on the antrum shell 12 and is adapted for revolution about the periphery of the antrum shell 12. A circular oculus 35 is provided in the rotor shell 30 and has a center 36. The oculus 35 is covered by an oculus window 2. The oculus window 2 is adapted to rotate about an axis through the center of the oculus window 2 and perpendicular to its surface. Through the coordinated rotation of the antrum shell 12 about the zenith axis 6 and revolution of the rotor shell 30 about the periphery of the antrum shell 12, the center of the oculus 35 can be brought into any position in the hemisphere located above a horizon axis. More specifically, rotation of the rotor shell 30 about the periphery of antrum shell 12 adjusts the elevation of the center 36 of the oculus 35 between a minimum level shown in FIG. 1 and a maximum at which the center 36 of the oculus 35 lies on the zenith axis 6. Since the antrum shell 12 rotates about the zenith axis 6, and the rotor shell 30 rotates about the periphery of the antrum shell 12, the center 36 of the oculus 35 can be adjusted to point in any direction with respect to the zenith axis 6, including directly on the zenith axis 6.

A partially spherical shutter lid 50 is, for example, fixedly mounted on the antrum shell 12. The shutter which is essentially an extension of the antrum shell 12 covers a substantial portion of the rotor shell 30 but includes a scalloped edge 52 forming a curved elongated aperture between the edge of the antrum and the end of the lid such that a curved portion of the rotor shell remains uncovered. The curved portion of the rotor shell 30, which remains uncovered preferably corresponds to the path of the oculus as the center 36 of the oculus 35 moves from the horizontal axis 7 to the zenith axis 6.

The oculus 35 is designed to mount an oculus window 2 in the oculus and align it with the optical axis of, for example, a telescope at the centrum of a dome, e.g., a split-sphere fixed shutter dome, such as shown in FIG. 1. A rotating oculus window may allow filters, lenses, windows, and instruments to be rotated in the line of site of a telescope, laser, or other instrument, mounted within the split-sphere dome 1, as the oculus moves through the hemisphere of motion of the rotor 30. The rotating oculus window 2 may be achieved by mounting a ringtype bearing at the edge of the oculus to which is attached a plate, frame, or other mounting surface to rigidly support the lens, filter, window, or instrument to align perfectly with the telescope, laser, or other instrument at, for example, the centrum of the split-sphere dome. The oculus window 2 may be mounted, for example, within the oculus 35 with a bearing between the outer edge of the oculus window 2 and the inner circumference of the oculus 35. Alternatively, the oculus window 2 may be mounted, for example, over the oculus, so that the diameter of the oculus window 2 is larger than the diameter of the oculus 35. In this case, the oculus window 2 may be supported by, for example, rollers or bearings mounted on a portion of the rotor 30 that forms the periphery of the oculus 35. The oculus window 2, therefore, may be rotatably mounted over the oculus 35, on the rotor 30. The oculus window 2 may be mounted on the side of the rotor 30 exterior to the dome 1 or on the side of the rotor 30 interior to the dome 1. The oculus window 2 may also be rotatably mounted within the oculus 35, as described above. The oculus window 2, therefore, serves to cover the oculus 35 and is rotatably supported by the rotor 30 within the oculus 35, on the exterior side of the rotor 30, or on the interior side of the rotor 30.

Figure 2:
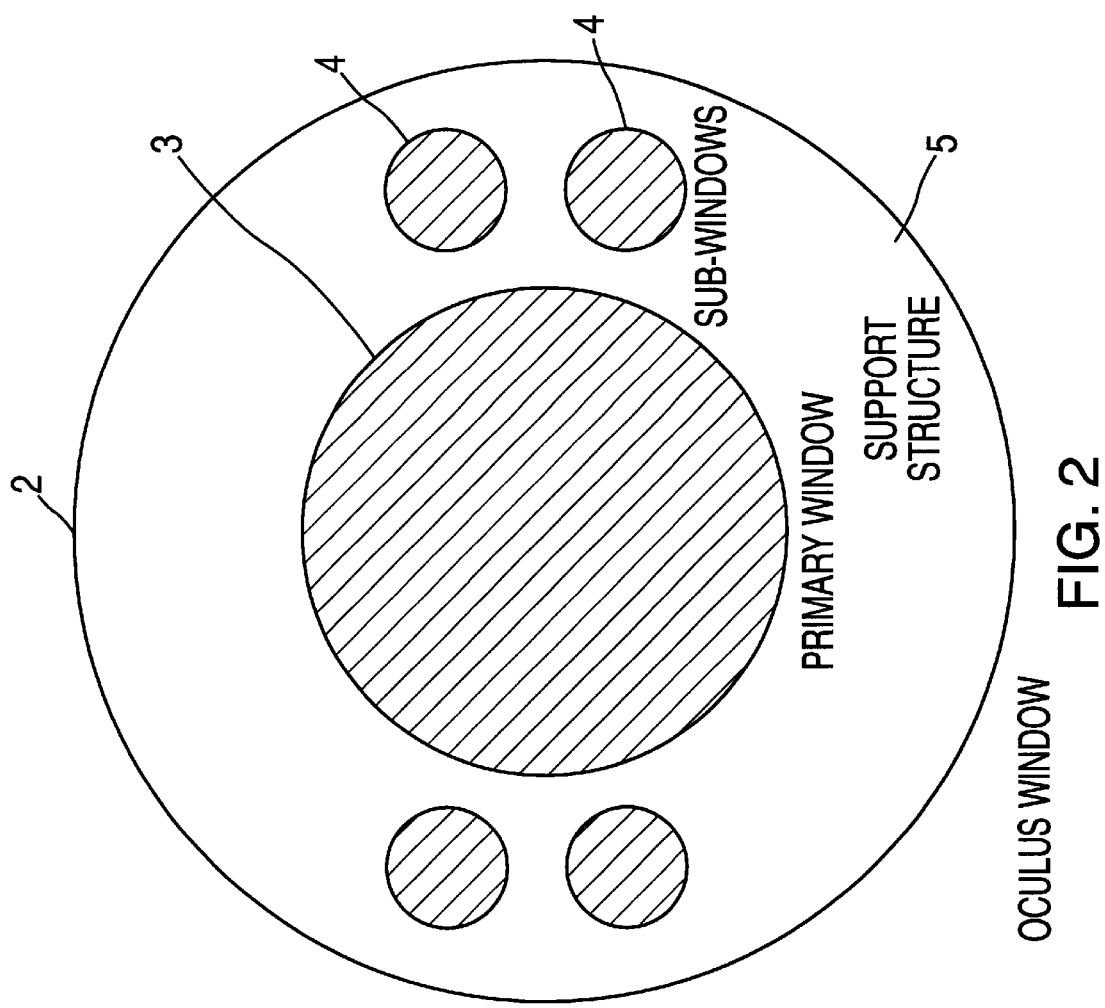
FIG. 2 is a surface view of an oculus window.

An example of an oculus window 2 is shown in FIG. 2. The oculus window 2 shown in FIG. 2 may be used, for example, for a dome that houses a telescope with four lasers arranged circumferentially to the telescope. The oculus window 2 includes a primary window 3 and sub-windows 4 concentrically disposed in the primary window 3. The windows 3, 4 may be disposed in, and supported by, a supporting structure 5. The main, or center window 3 is, for example, for a telescope and the four smaller sub-windows 4 are, for example, for lasers, which are arranged parallel to the telescope. In another embodiment of the invention, the primary window 3 may comprise the entire oculus window 2.

The windows 3, 4 may be composed of, for example, optical glass or plastic, or one or more of the windows may comprise a hole in the oculus window, which is open to the atmosphere. Plastic windows may be constructed of, for example, high quality acrylics, plexiglass, or a Mylar™ screen stretched across the oculus window. A Mylar™ screen may not be as thick as the wave length of light is long, so it will not cause any refraction of the incoming light, and a telescope will be able to receive light with no distortions, despite the presence of a window. Furthermore, the windows 3, 4 may be coated with various coatings such as a polarizing coating, a filter, or a half-mirrored surface.

The supporting structure 5 of the oculus window 2 may be constructed of the same material as the windows 3, 4, or it may be constructed of another rigid material such as, for example, a honeycomb aluminum covered with a metal coating, or a simple articulated, framed steel cell. The material comprising the supporting structure 5 of the oculus window 2 may be the same type of material as the rotor, or it may be an entirely different material and construction.

Figure 3:
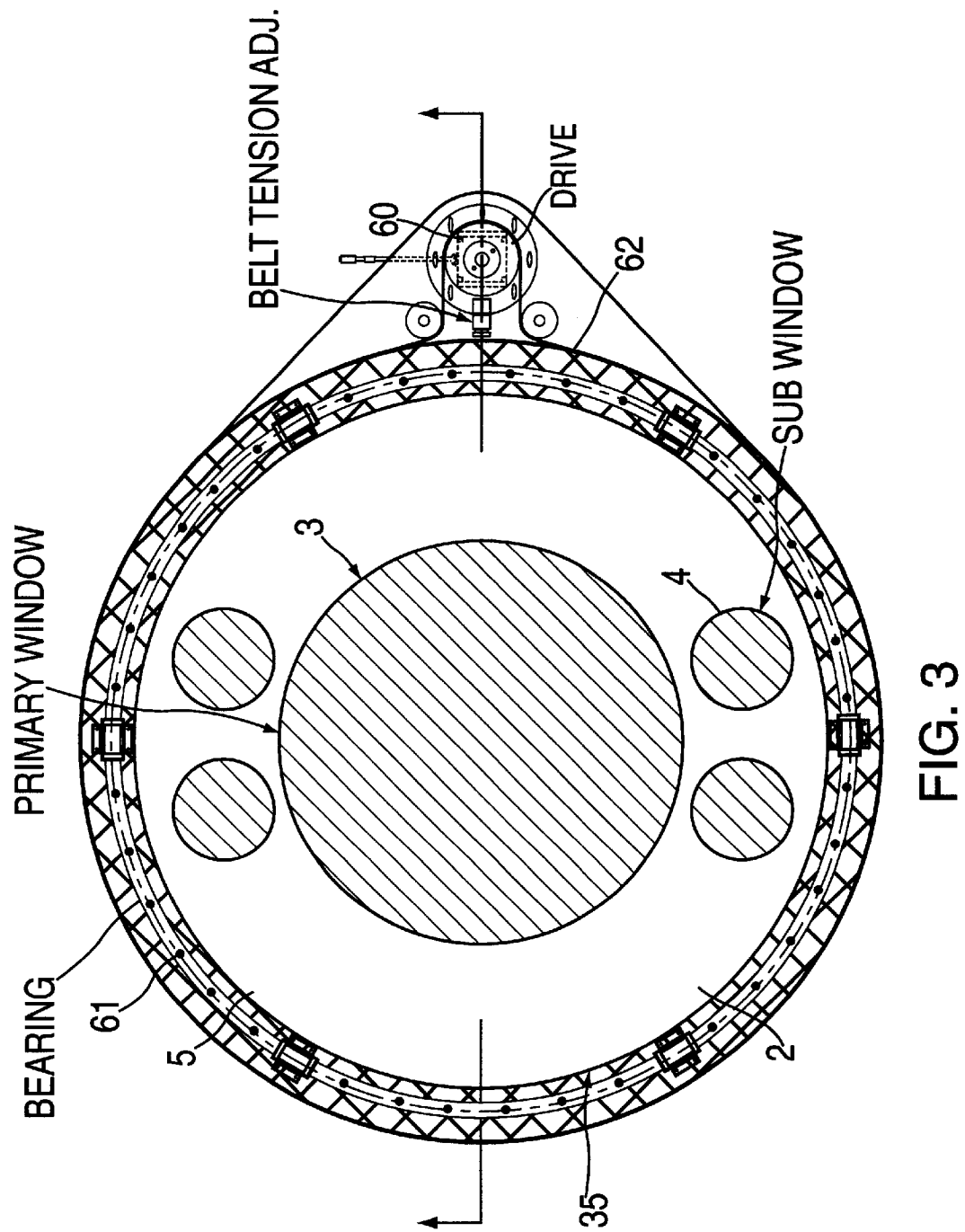
FIG. 3 is an inside view of a rotatable oculus window.

FIG. 3 shows an example of a rotatable oculus window 2 supported and rotated by a ring bearing 61 and driven by a drive mechanism 60. The ring bearings may be, for example, bearings such as those produced by the THK Co., Ltd., Tokyo, Japan. See, e.g., "LM System Lineal Motion Systems" Catalog No. 200-1AE, THK Co. pages 240–43. Ring bearings are available in a multitude of sizes and with many different features. For example, ring bearings are available with a geared cog on the side. A track, such as used with worm drives and other similar drive mechanisms allow the system to be driven. There may be a simple geared drive on one side which may be motorized (e.g., with a stepper motor) that would turn like any turntable. This can be used, for example, with polyurethane wheels or steel wheels acting on stainless steel, or if they are geared, a cogged drive around the perimeter. Alternatively, the drive mechanism may include a motor, such as an electric motor, attached to a drive belt 62, as shown in FIG. 3.

Figure 4:
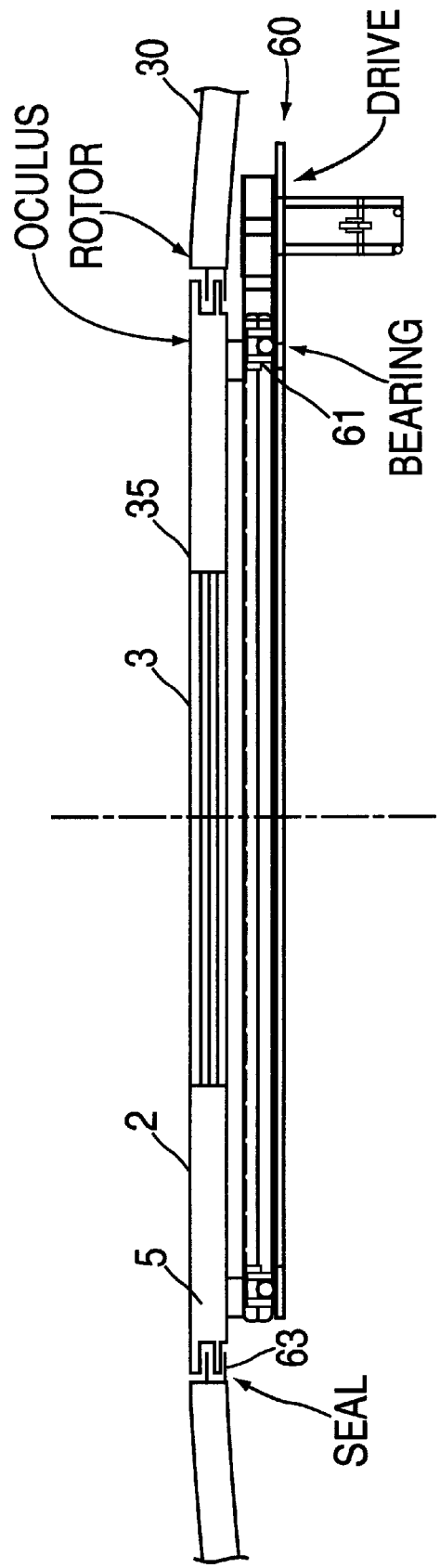
FIG. 4 is a cross section view of the rotatable oculus window of FIG. 3.

FIG. 4 shows a cross section view of the rotatable oculus window, including a bearing and drive mechanism, shown in FIG. 3. The oculus window 2, rotor 30, primary window 3, drive mechanism 60, and bearing 61 are all shown in cross section. Also shown is a cross sectional view of a seal 63 between the oculus window 2 and the rotor shell 30.

Laser telescopes are used for satellite laser ranging in which the telescope mounts at its focus a laser beam which is then directed to an object at some distance, for example, a satellite with reflecting gates on it. The laser can then be used to measure the distance to the satellite, and determine its location, and the satellite can be observed with the telescope at the same time because of the coaxial laser and optical beams. Lasers may also be provided, for example, outside the telescope. Laser telescopes can be used for organizing, guidance, control, and maneuvering of satellites that have to be kept in specific orbits or where the satellite is a target and pairs of fixed lasers point and triangulate off the satellite. A system such as this may be used, for example, for very accurate global positioning or to detect earth movements (e.g., earthquakes).

As a telescope or other housed device moves (e.g., rotates) to track an object or location across the sky, the oculus moves with it. By providing for the rotation of the oculus window, the orientation of the window to the housed device can be maintained as the device tracks across the sky. In the case where multiple lasers are provided outside the center of the telescope, (e.g., around the circumference of the telescope), multiple sub-windows 4 may be provided in the oculus window 2. As the telescope (and therefore the oculus) moves across the sky, to for example, track a satellite, the window is rotated so that the sub-windows remain in a fixed position with regard to the lasers. Rotation of an oculus window may also be employed, for example, in the case of a polarized window to keep the polarizing lines in a constant orientation with respect to the housed device.

A rotating oculus allows a window to remain in a constant orientation. As the oculus ascends on the rotor, it ends up at the top (pointing along the zenith (vertical) axis of the dome 6) rotated 180 degrees with respect to the instruments housed in the dome. Another example of an instrument requiring a constant orientation with a window 3, 4 is an instrument called a splitter, which has a vibrating mirror to give a close look right back at the telescope and a long look at stars or some other distant object. These instruments constantly flip a mirror in front of the telescope. If the mirror is mounted on the oculus, it is desirable that the mirror stay on axis with the telescope as the telescope changes its orientation to track across the sky. Typically filters and polarizing lenses and split instruments and the like have to be rotating in the oculus as it ascends the rotor.

In one embodiment of the invention, the need to keep laser telescopes cool, even during daytime use, means that the space inside the dome is air conditioned. In this case a primary window 3 and, if present, sub-windows 4 may be comprised of layers of optical glass, for example on the order of 10 centimeters thick, that are separated by, on the order of, 2 millimeters of space filled with nitrogen gas, so that the window acts as an insulator. Alternatively, a window 3, 4 may be a single optical plate about one inch thick. The window may be of a type produced by, for example, Corning, Inc., Corning, N.Y.

The oculus window 2 may be rotated through the use of various motors and ring bearings that are controlled so that the window is maintained in a consistent orientation to the housed device (e.g., a telescope). The rotation may be controlled, for example, by a computer system linked to electrical motors that control the rotation of the window. The system for controlling the window rotation may be linked to the system for controlling the movement (e.g., rotation, pivoting) of the telescope in order to coordinate their movements and keep the instrument/oculus orientation constant. Alternatively, the telescope and window movements may be controlled by the same systems. This may be a computer system or an electro-mechanical timing or feedback system.

The shutter 50 portion of the dome 1 covers and protects the oculus when the oculus is not being used. The edge of the shutter 50 may form a seal with the rotor portion of the dome. This seal may act, for example, as a "windshield wiper" so that essentially the area under the shutter is protected from the exterior environment. A seal against the rotor portion of the dome may not be absolutely necessary where there is a window, but it may prevent rain, for instance, from coming down over the top of the dome and running over the window. The seal may comprise, for example, simple brushes guiding ice and rain, etc. away from behind the shutter or a tiny regulator rise or flow placed adjacent to the oculus and can be used to guide rain in a similar manner to the mechanism used on, for example, a car door. In extreme environments where there are icing problems, the seals may be heated and they may have teeth to sweep off ice. Seals required to stand up to low temperatures and remain flexible may be constructed, for example, of materials similar to those used by the food packaging industry to make conveyer belts for use in freezers. The dome may be also designed to protect the telescope from wind by keeping only a minimum opening needed for the telescope.

The oculus window 2 (including any primary window 3 and subwindows 4) can be flat in relation to the curvature of the shutter. Because they are optically flat in relation to the mirror, they form a cord across the dome and are well back from the seal when it goes by (e.g., when the dome rotates to close the shutter). The seals stay on the curvature of the rotor and the glass is essentially the cord of the oculus.

What is claimed is:

1. In a split-sphere observatory dome of the type comprising:
   a cylindrical base having a circular peripheral edge,
   an antrum shell having a first circular peripheral edge rotatably supported on the circular peripheral edge of the cylindrical base and a second circular peripheral edge disposed at an acute angle with respect to said first circular peripheral edge,
   a rotor shell having a first circular peripheral edge rotatably supported on the second circular peripheral edge of the antrum shell and a second circular peripheral edge disposed at an angle with respect to said first circular peripheral edge of said rotor shell and tangential thereto at a point, said second circular peripheral edge of said rotor shell defining the periphery of a planar oculus;
   wherein upon rotation of the rotor shell said oculus revolves about an axis of rotation along a path wherein the orientation of the plane of the oculus varies between a vertical orientation and a horizontal orientation;
   the improvement comprising:
   a shutter lid fixed to said antrum shell proximate said second circular peripheral edge of said antrum shell, said shutter lid covering a portion of said rotor shell and exposing a portion of said rotor shell, said oculus being revolvable between a position wherein said lid completely covers said oculus and a position wherein said oculus is completely exposed; and
   an oculus window rotatably supported by the rotor shell and adapted to rotate to provide a predetermined orientation between the oculus window and an instrument housed within the split-sphere observatory dome, despite rotation of the rotor shell.

2. A split-sphere observatory dome comprising:
   a cylindrical base having a circular peripheral edge,
   an antrum shell having a first circular peripheral edge rotatably supported on the circular peripheral edge of the cylindrical base and a second circular peripheral edge disposed at an acute angle with respect to said first circular peripheral edge,
   a rotor shell having a first circular peripheral edge rotatably supported on the second circular peripheral edge of the antrum shell and a second circular peripheral edge disposed at an angle with respect to said first circular peripheral edge of said rotor shell and tangential thereto at a point, said second circular peripheral edge of said rotor shell defining the periphery of an oculus;

an oculus window rotatably supported by the rotor shell and adapted to rotate to provide a predetermined orientation between the oculus window and an instrument housed within the split-sphere observatory dome, despite a rotation of the rotor shell.

3. The split-sphere observatory dome of claim 1, the oculus window including a primary window and at least one sub-window.

4. The split-sphere observatory dome of claim 2, the at least one sub-window circumferentially disposed around the primary window.

5. The split-sphere observatory dome of claim 1, the dome housing an instrument for receiving and processing a light input;

the oculus window comprised of a plastic screen having a thickness smaller than the wave length of the light input.

6. The split-sphere observatory dome of claim 1, the dome housing an instrument, and the dome further comprising:

a computer system for controlling both movement of the instrument and rotation of the oculus window.

7. The split-sphere observatory dome of claim 1, further comprising a seal between the oculus window and the rotor shell.

8. The split-sphere observatory dome of claim 1, the oculus window including a primary window comprised of a polarized material.

* * * * *